US012650354B2

(12) United States Patent (10) Patent No.: US 12,650,354 B2

Zhang et al. (45) Date of Patent: Jun. 9, 2026

(54) MONITORING DEVICE AND METHOD FOR SETTLEMENT OF TRANSMISSION TOWER

(71) Applicant: STATE GRID XINJIANG CO., LTD. ELECTRIC POWER RESEARCH INSTITUTE, Urumqi (CN)

(72) Inventors: Xiaolei Zhang, Urumqi (CN); Weixin Liu, Urumqi (CN); Xiaojian Liu, Urumqi (CN); Jijun Yang, Urumqi (CN); Ruijun Dou, Urumqi (CN); Yajie Zhuang, Urumqi (CN); Tianyi Liu, Urumqi (CN); Xiaoxing Zhang, Urumqi (CN); Tianle Wang, Urumqi (CN)

(73) Assignee: STATE GRID XINJIANG CO., LTD. ELECTRIC POWER RESEARCH INSTITUTE, Urumqi (CN)

( * ) Notice: Subject to any disclaimer, the term of this patent is extended or adjusted under 35 U.S.C. 154(b) by 330 days.

(21) Appl. No.: 18/563,233

(22) PCT Filed: Aug. 16, 2023

(86) PCT No.: PCT/CN2023/113309

§ 371 (c)(1),
(2) Date: Nov. 21, 2023

(87) PCT Pub. No.: WO2023/241743

PCT Pub. Date: Dec. 21, 2023

(65) Prior Publication Data

US 2024/0230447 A1     Jul. 11, 2024

(30) Foreign Application Priority Data

Jun. 16, 2022   (CN) .......................... 202210683057.0

(51) Int. Cl.
*G01M 1/08* (2006.01)
*G01B 5/00* (2006.01)
(Continued)

(52) U.S. Cl.
CPC ............. *G01M 1/08* (2013.01); *G01B 5/0007* (2013.01); *G01B 5/24* (2013.01); *G01D 11/30* (2013.01); *G01S 17/08* (2013.01)

(58) Field of Classification Search
CPC ......... G01M 1/08; G01B 5/24; G01B 5/0007; G01S 17/08; G01D 11/30
See application file for complete search history.

(56) References Cited

U.S. PATENT DOCUMENTS

2018/0023934 A1* 1/2018 Gjertsen .................. G01B 3/08
33/809
2021/0073692 A1* 3/2021 Saha ................ G06Q 10/06316

FOREIGN PATENT DOCUMENTS

CN       208547349 U       2/2019
CN       111856482 A   *  10/2020   ............... G01S 7/02
(Continued)

OTHER PUBLICATIONS

International Search Report for International Application No. PCT/CN2023/113309, dated Nov. 18, 2023 (Nov. 18, 2023)—3 pages (English translation—2 pages).

*Primary Examiner* — Stephanie E Bloss
*Assistant Examiner* — Diana Hancock
(74) *Attorney, Agent, or Firm* — CM Law; Stephen J. Weed

(57) ABSTRACT

Provided is a monitoring device for the settlement of a transmission tower. The monitoring device includes a laser ranging sensor, an acceleration sensor, a central processing module, a battery, and a fixing plate. The laser ranging sensor is configured to measure the distance between the (Continued)

installation position of the monitoring device and the ground. The acceleration sensor is configured to measure the inclination angle of a tower leg. The central processing module is configured to process measurement data of the laser ranging sensor and the acceleration sensor. The battery is configured to supply power to the laser ranging sensor, the acceleration sensor, and the central processing module. The fixing plate is configured to fix the monitoring device to the tower leg of the transmission tower. A method for monitoring a settlement of a transmission tower is further provided.

6 Claims, 5 Drawing Sheets

(51) Int. Cl.
  *G01B 5/24*    (2006.01)
  *G01D 11/30*   (2006.01)
  *G01S 17/08*   (2006.01)

(56)      References Cited

FOREIGN PATENT DOCUMENTS

| CN | 212779193 U | | 3/2021 |
|----|-------------|---|--------|
| CN | 216206272 U | | 4/2022 |
| CN | 216410157 U | * | 4/2022 |
| CN | 115164831 A | | 10/2022 |

* cited by examiner

MONITORING DEVICE AND METHOD FOR SETTLEMENT OF TRANSMISSION TOWER

CROSS-REFERENCE TO RELATED APPLICATIONS

This is a National Stage Application, filed under 35 U.S.C. 371, of International Patent Application No. PCT/CN2023/113309, filed on Aug. 16, 2023, which claims priority to Chinese Patent Application No. 202210683057.0 filed with the China National Intellectual Property Administration (CNIPA) on Jun. 16, 2022, the disclosures of which are incorporated herein by reference in their entireties.

TECHNICAL FIELD

The present application belongs to the technical field of transmission line tower settlement monitoring, for example, a monitoring device and method for a settlement of a transmission tower.

BACKGROUND

Transmission lines are important transportation channels for energy in China. Transmission line towers are the main carriers of power lines. The structural safety of the transmission line towers is critical to line operation. Transmission lines span a wide range of regions, inevitably through areas prone to geological changes, such as collapsible loess areas, coal goaf areas, and geological movement areas. Accidents such as a tower settlement and a structural deformation occur from time to time. If the state of a transmission tower can be monitored in an early stage when a settlement of the transmission tower foundation occurs and causes a deformation of the main body of the tower, it is possible to gain time for operation and maintenance work, effectively contain the development of the accidents, and ensure the safe and efficient transmission of electric energy.

Tower settlement is usually measured using the Beidou carrier phase difference method or the level method. The Beidou carrier phase difference method requires grooving the concrete on the tower base, installing Beidou receivers and antennas, and monitoring the settlement of the tower base by using the signal difference of the Beidou satellite and the ground-based reference station. The static level method, by utilizing the principle of communicating vessels, fixes sensing modules on four tower bases in sequence and acquires a settlement value by measuring a liquid level difference in the fixed water tank at the tower leg. These two methods have the following limitations: The construction is difficult since groove construction is required; the assembly is difficult; and the economic benefits are insufficient.

SUMMARY

The present application provides a monitoring device and method for a settlement of a transmission tower, which reduces difficulty in monitoring the settlement of a transmission line tower. Moreover, it is easy to assemble, and grooving construction is not required, which improves economic benefits.

An embodiment of the present application provides a monitoring device for a settlement of a transmission tower.

The monitoring device includes a laser ranging sensor, an acceleration sensor, a central processing module, a battery, and a fixing plate.

The laser ranging sensor is configured to measure a distance between an installation position of the monitoring device and ground.

The acceleration sensor is configured to measure an inclination angle of a tower leg.

The central processing module is configured to process measurement data of the laser ranging sensor and the acceleration sensor.

The battery is configured to supply power to the laser ranging sensor, the acceleration sensor, and the central processing module.

The fixing plate is configured to fix the monitoring device to the tower leg of the transmission tower.

In an embodiment, multiple monitoring devices are provided, which are installed on the four tower legs of the transmission tower in a one-to-one correspondence, and each monitoring device is installed in a direction of the ridge of the transmission tower.

In an embodiment, the laser ranging sensor is parallel to the direction of the ridge of the transmission tower and is directed to the ground, and the acceleration sensor is installed horizontally.

An embodiment of the present application provides a monitoring method for a monitoring device for a settlement of a transmission tower, and the method includes the following steps: The preceding described monitoring device is installed on an untilted transmission tower. The height of the monitoring device from the ground is h. Rear extension lines of measurement directions of laser ranging sensors of monitoring devices located at four tower legs converge at a point A on the top of the tower. The distance between the monitoring device and the point A on the top of the tower is L. The distance measured by the laser ranging sensor between the installation position of the monitoring device and the ground is m. The x and y axes of the acceleration sensor are horizontally oriented toward the exterior side of the transmission tower and are perpendicular to each other. The z axis of the transmission tower in the untilted state is perpendicular to the ground, and the initial inclination angle is 0°.

In the case where the transmission tower is tilted, the acceleration sensor measures the inclination angle $\alpha$, and it is determined whether the inclination angle $\alpha$ is greater than 0 according to acceleration components on the x and y axes of the acceleration sensor and the value output by an angle meter of the acceleration sensor; where $\alpha>0$, it represents that the tower body at the monitoring device is tilted outwardly, and $\alpha<0$, it represents that the tower body at the monitoring device is tilted inwardly.

According to the distance x measured by the laser ranging sensor between the installation position of the monitoring device and the ground and the inclination angle $\alpha$ measured by the acceleration sensor, a height h' of a monitoring device from the ground is calculated, where the monitoring device is located at a point where the tower body is tilted outwardly in a case where the transmission tower is in the current tilted state.

The difference between the height h' of the monitoring device from the ground at the point where the tower body is tilted outwardly in the current tilted state of the transmission tower and a height h of the monitoring device from the ground in a case where the transmission tower is in the untilted state is compared and calculated, and the difference is used as the settlement value of the transmission tower.

In an embodiment, calculating the height h' of the monitoring device from the ground at the point where the tower body is tilted outwardly in the current tilted state of the transmission tower includes determining the height h' of the monitoring device from the ground according to the principle of similar triangles.

$$\frac{A'a'}{m'} = \frac{a'W}{\sqrt{(m')^2 - (h')^2}}.$$

In the formula, A'a'=L; m' is obtained through measurement; h' is the height of the current sensor; A is an intersection point of the rear extension lines of the measurement directions of the laser ranging sensors of the monitoring devices; a is the installation point of the monitoring device; an intersection point of a horizontal direction of a and a vertical downward extension line of A is point o; the length of a line segment oa is measured as R, and an intersection point of the point a vertically downward with the ground is denoted as a point Q; after the tower is tilted, the position of the sensor is a', and the distance measured by the laser ranging sensor is m'; before the tower is tilted, $\Delta aQP$ is similar to $\Delta Aoa$, and after the tower is tilted, $\Delta a'Q'P' \sim \Delta A'o'a'$.

In an embodiment, calculating the height h' of the monitoring device from the ground at the point where the tower body is tilted outwardly in the current tilted state of the transmission tower includes calculating the length of line segment a'W according to the principle of similar triangles; $\Delta A'o'G \sim \Delta a'WG$, and $$a'W = \frac{R \cos \alpha}{1 + \sqrt{L^2 - R^2} \tan \alpha \cos \alpha}.$$

The inclination angle $\alpha$ is measured by the acceleration sensor; the position of the monitoring device after the tower is tilted is a'; the distance between a reverse extension line of the rear extension line of the monitoring device and the ground is m'; the intersection point A is transferred to A'; an intersection point of the horizontal direction of the point a and the vertical downward extension line of A' is denoted as the point W; o is transferred to o'; an intersection point of a line segment a'o' and a vertical downward extension line of A' is G.

Figure 1:
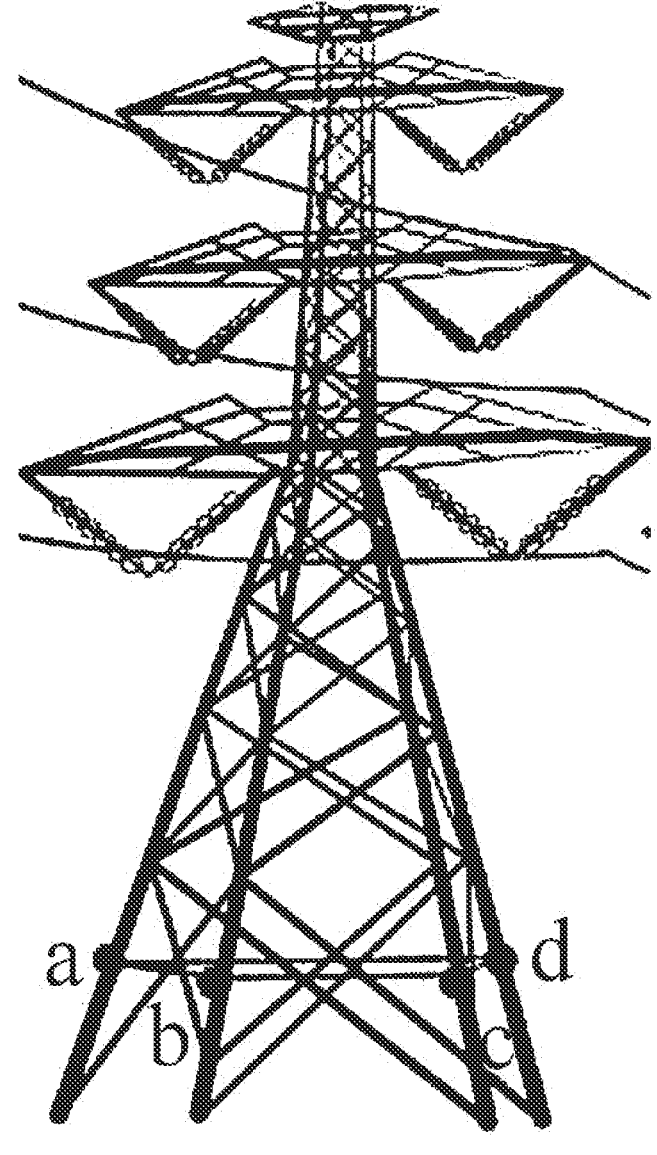
FIG. 1 is a schematic diagram illustrating the layout of a transmission tower and monitoring devices according to an embodiment of the present application.

REFERENCE LIST 1 laser ranging sensor
2 acceleration sensor 3 central processing module
4 battery
5 fixing plate

DETAILED DESCRIPTION

The technical schemes in embodiments of the present application will be described below in conjunction with drawings in embodiments of the present application.

As shown in FIGS. 1 to 6, embodiments of the present application provide a monitoring device and method for a settlement of a transmission tower. The monitoring device is fixed to a tower leg of the transmission tower by a fixing plate 5, the monitoring device includes a laser ranging sensor 1, an acceleration sensor 2, a central processing module 3, and a battery 4. The laser ranging sensor 1 is configured to measure a distance between an installation position of the monitoring device and the ground. The acceleration sensor 2 is configured to measure an inclination angle of the tower leg. The central processing module 3 is configured to process measurement data of the laser ranging sensor 1 and the acceleration sensor 2. The battery 4 is configured to supply power to the laser ranging sensor 1, the acceleration sensor 2, and the central processing module 3.

Monitoring devices are installed at the four corners a, b, c, and d of the transmission tower, respectively (referring to FIG. 1 for the deployment). Each monitoring device is installed in the direction of the ridge of the transmission tower. It is ensured that the acceleration sensor 2 inside the monitoring device is in a horizontal state, and the measurement direction of the laser ranging sensor 1 is parallel to the direction of the ridge of the transmission tower and is directed to the ground. It is assumed that the transmission tower is in an untilted state, and the monitoring device is installed at a distance whose height from the ground is h.

Figure 2:
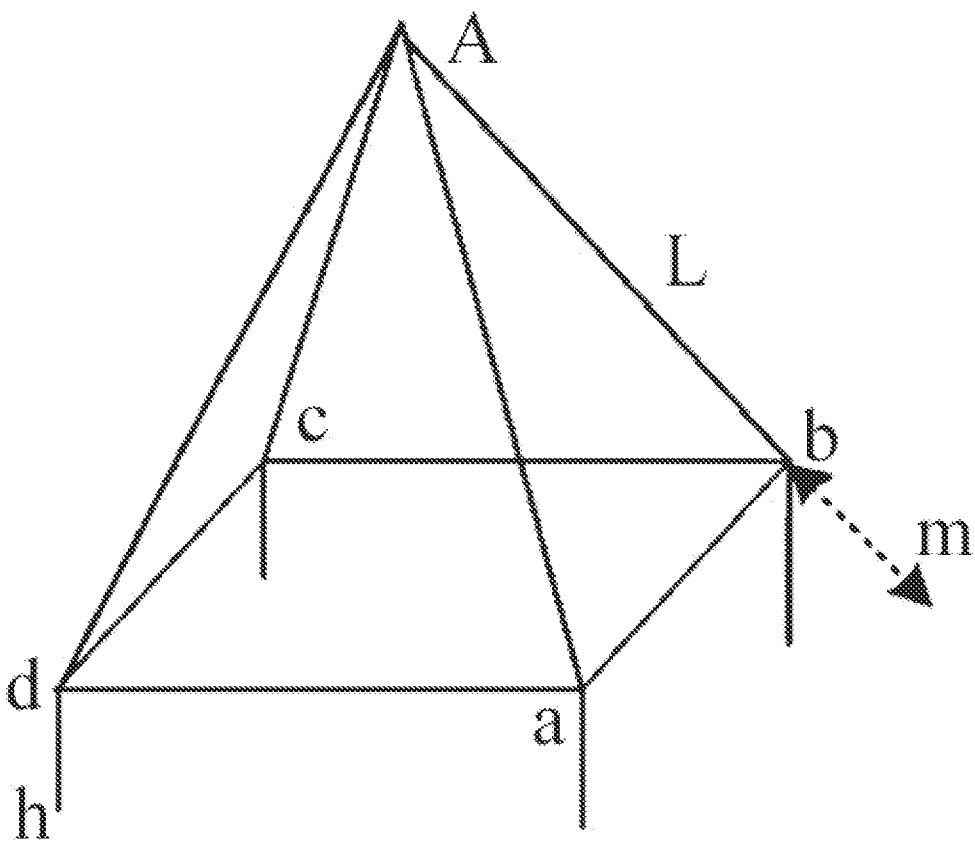
FIG. 2 is a schematic diagram illustrating the principle of a method for monitoring a settlement of a transmission tower according to an embodiment of the present application.

As shown in FIG. 2, after FIG. 1 is simplified, the rear extension lines of the laser ranging sensors 1 converge at the point A on the top of the tower.

Figure 3:
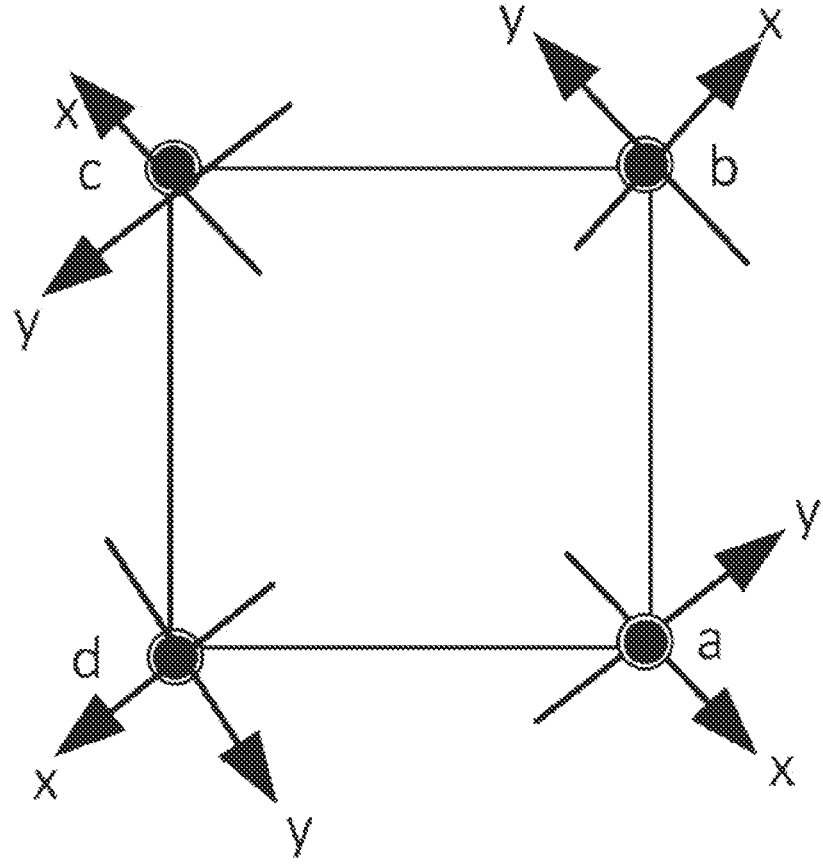
FIG. 3 is a top view illustrating the installation of sensors according to an embodiment of the present application.

As shown in FIG. 3, FIG. 3 is a top view of the tower, when the monitoring device is installed, the x and y axes of the acceleration sensor 2 are horizontally oriented outwardly.

Figure 4:
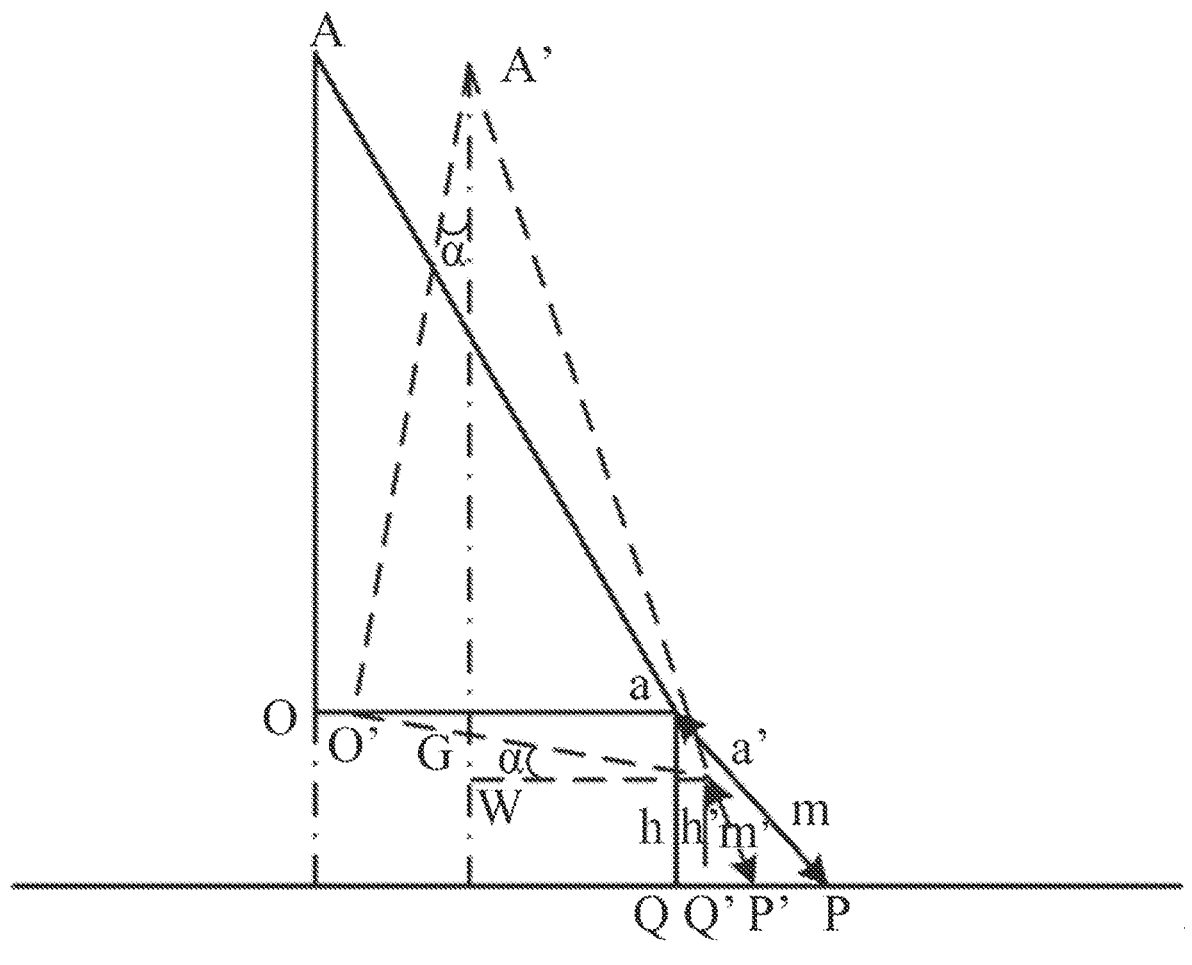
FIG. 4 is a diagram illustrating the analysis of a tilted tower according to an embodiment of the present application.
Figure 5:
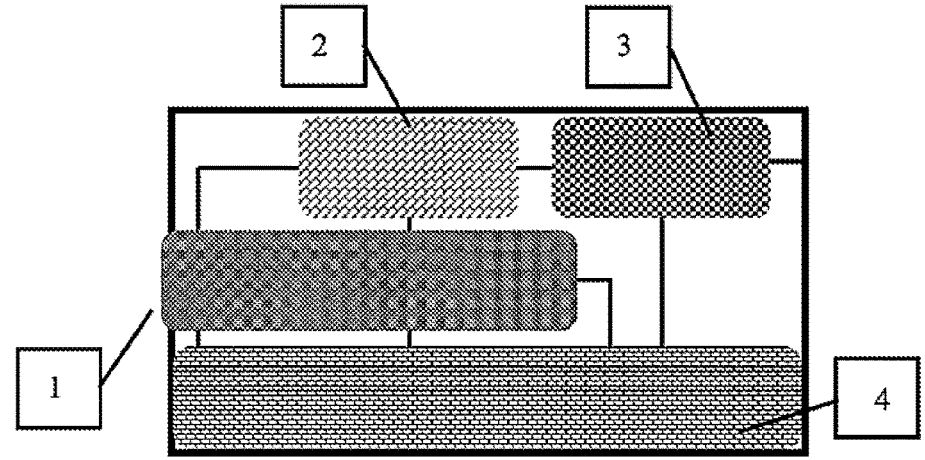
FIG. 5 is a diagram illustrating the internal structure of a monitoring device according to an embodiment of the present application.
Figure 6:
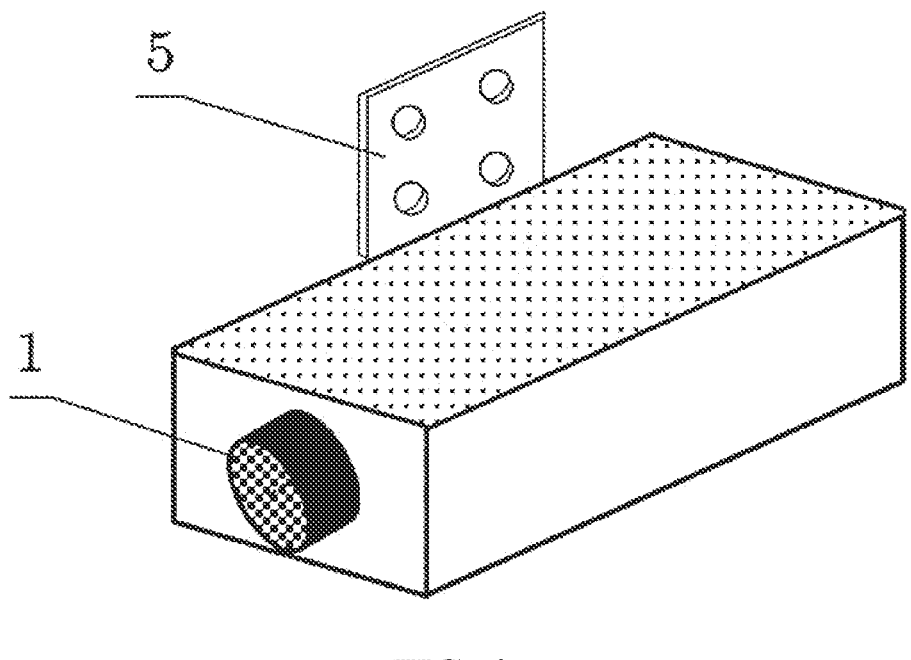
FIG. 6 is an external view of the monitoring device according to an embodiment of the present application.

The distance from the installation position of the laser ranging sensor 1 to the point A may be known from the design drawing or measurement. Assuming that the distance is L, the distance measured by the laser distance ranging sensor 1 between the initial installation position and the ground is m, and the inclination angle of the transmission tower on the z axis is 0°, as shown in FIG. 4.

When the transmission tower is tilted, the acceleration sensor 2 may measure the inclination angle $\alpha$. Additionally, whether the inclination angle $\alpha$ is greater than or less than 0 is determined according to acceleration components on the x and y axes of the acceleration sensor 2 and the value output by an angle meter of the acceleration sensor 2. When $\alpha > 0$, it represents that the tower body at the monitoring device is tilted outwardly, and when $\alpha < 0$, it represents that the tower body at the monitoring device is tilted inwardly.

In the inclination process of the transmission tower, the height from the ground output by the laser ranging sensor 1 and the inclination angle output by the acceleration sensor 2 in the monitoring device constantly change so that the settlement value after the transmission tower is tilted is known. As shown in FIG. 4, the settlement state of a monitoring device from the ground is analyzed, and the monitoring device is located at a point where the tower body is tilted outwardly. A is an intersection point. a is the installation point of the monitoring device. The solid line is the state before the tower body is tilted. The length of the line segment ao is measured as R. The dotted line is the position after the state of the tower body changes. The position of the monitoring device after the tower body is tilted is a'. The distance measured by the laser ranging sensor 1 is m'. Before the tower is tilted, ΔaQP is similar to ΔAoa; and after the tower is tilted, Δa'Q'P' is similar to ΔA'o'a'. Therefore, the following is obtained:

$$\frac{A'a'}{m'} = \frac{a'W}{\sqrt{(m')^2 - (h')^2}}. \tag{1}$$

In the formula, A'a'=L; m can be measured; and h' is the height of the current sensor.

In formula (1), the length of line segment a'W needs to be obtained first if h' is required; another similar triangle is found in the drawing, that is, ΔA'o'G~Δa'WG. According to the principle of similar triangles, $$\frac{a'W}{A'o'} = \frac{GW}{Go'}; \tag{2}$$

$$GW = a'W \tan \alpha; \tag{3}$$

$$Go' = R - \frac{a'W}{\cos \alpha}; \tag{4}$$

$$A'o' = \sqrt{L^2 - R^2}. \tag{5}$$

Formulas (3), (4), and (5) are substituted into formula (2), and formula (2) may be expressed as follows:

$$\frac{a'W}{\sqrt{L^2 - R^2}} = \frac{a'W \tan \alpha}{R - \frac{a'W}{\cos \alpha}}. \tag{6}$$

Formula (6) is calculated to obtain the following:

$$a'W = \frac{R \cos \alpha}{1 + \sqrt{L^2 - R^2} \tan \alpha \cos \alpha}. \tag{7}$$

The current height h' of the point a' from the ground may be obtained by substituting a'W into formula (1). The difference between h' and h is the settlement value of the point a after the transmission tower is tilted.

In the present application, monitoring devices are installed at the legs of a transmission tower to monitor changes in the angle of the tower leg and distance from the ground in real time, thereby obtaining the settlement of the transmission tower. The measurement method is simple, by which the real-time settlement state can be quickly acquired. The monitoring device of the present application has the following advantages: no need for grooving construction, compactness, low power consumption, and accurate monitoring of tower base settlement. Moreover, the assembly is simple, the construction difficulty is low, and the cost is low.

In the present application, relationship terms such as first and second are used merely to distinguish one entity or operation from another entity or operation and do not necessarily require or imply any such actual relationship or order between these entities or operations. Additionally, the term "comprising", "including", or any other variant thereof is intended to encompass a non-exclusive inclusion so that a process, method, article, or device that includes a series of elements not only includes the expressly listed elements but also includes other elements that are not expressly listed or elements inherent to such a process, method, article, or device.

What is claimed is:

1. A monitoring device for a settlement of a transmission tower, comprising:

a laser ranging sensor, an acceleration sensor, a central processing module, a battery, and a fixing plate; wherein the laser ranging sensor is configured to measure a distance between an installation position of the monitoring device and ground, the laser ranging sensor is arranged along a direction of a ridge of the transmission tower so that a measurement direction of the laser ranging sensor is parallel to the direction of the ridge of the transmission tower and directed to ground, and a rear extension line of the measurement direction of the laser ranging sensor converges at a top point of the tower;

the acceleration sensor is configured to measure an inclination angle of a tower leg of the transmission tower, and the acceleration sensor is installed horizontally;

the central processing module is configured to acquire the distance measured by the laser ranging sensor and the inclination angle measured by the acceleration sensor, determine whether the transmission tower is tilted according to the inclination angle, calculate a height of the monitoring device from the ground according to the distance, the inclination angle, and pre determined geometrical parameters of the tower of the transmission tower based on a principle of similar triangles, and take a difference between the height of the monitoring device from the ground and an initial height h of the monitoring device from the ground as a settlement value of the transmission tower, wherein the geometrical parameters of the tower comprises a distance L between the monitoring device and the top point of the transmission tower, a horizontal shift R between the monitoring device and the top point of the transmission tower the initial height h of the monitoring device from the ground, and an initial distance m between the installation position of the monitoring device and the ground;

the battery is configured to supply power to the laser ranging sensor, the acceleration sensor, and the central processing module; and the fixing plate is configured to fix the monitoring device to the tower leg of the transmission tower.

2. The device of claim 1, wherein a plurality of monitoring devices are provided, which are installed on four tower legs of the transmission tower in a one-to-one correspondence, and each of the plurality of monitoring devices is installed in the direction of the ridge of the transmission tower.

3. A method for monitoring a settlement of a transmission tower, comprising:

installing a monitoring device for the settlement of the transmission tower on a tower leg of the transmission tower in an untilted state to enable a measurement direction of a laser ranging sensor in the monitoring device to be parallel to a direction of a ridge of the transmission tower and directed to ground, wherein the monitoring device comprises the laser ranging sensor, an acceleration sensor, a central processing module, a battery, and a fixing plate; wherein the laser ranging sensor is configured to measure a distance between an installation position of the monitoring device and the ground; the acceleration sensor is configured to measure an inclination angle of a tower leg of the transmission tower; the central processing module is configured to determine a settlement value of the transmission tower based on measurement data of the laser ranging sensor and measurement data of the acceleration sensor;

in response to the transmission tower being in the untilted state, acquiring a distance L between the monitoring device and a top point of the transmission tower, a horizontal shift R between the monitoring device and the top point of the transmission tower, an initial height h of the monitoring device from the ground, and an initial distance m between the installation position of the monitoring device and the ground;

wherein in a case where a plurality of monitoring devices are provided, rear extension lines of measurement directions of laser ranging sensors of the plurality of monitoring devices respectively installed at four tower legs of the transmission tower converge at the top point A of the transmission tower; an x axis of the acceleration sensor and a y axis of the acceleration sensor are horizontally oriented toward an exterior side of the transmission tower and are perpendicular to each other; and a z axis of the transmission tower in the untilted state is perpendicular to the ground;

in a case where the transmission tower is tilted, determining whether the inclination angle $\alpha$ is greater than 0 according to an acceleration component on the x axis of the acceleration sensor, an acceleration component on the y axis of the acceleration sensor and a value output by an angle meter of the acceleration sensor; wherein $\alpha$ greater than 0 represents that a tower body at the monitoring device is tilted outwardly, and $\alpha$ less than 0 represents that a tower body at the monitoring device is tilted inwardly;

calculating, according to the distance L, the horizontal shift R, the initial height h, the inclination angle $\alpha$ and the distance m, a height h' of the monitoring device from the ground based on a principle of similar triangles, wherein the monitoring device is located at a position where the tower body is tilted outwardly in a case where the transmission tower is in a current tilted state; and comparing and calculating a difference between the height h' of the monitoring device from the ground and the initial height h of the monitoring device from the ground, and using the difference as the settlement value of the transmission tower.

4. The method of claim 3, wherein calculating the height h' of the monitoring device from the ground comprises:

determining the height h' of the monitoring device from the ground according to the following principle of similar triangles; wherein $$\frac{A'a'}{m'} = \frac{a'W}{\sqrt{(m')^2 - (h')^2}},$$

where A'a'=L, an intersection point between a horizontal direction of the installation position and a vertical downward extension line of the point A is a point o; the horizontal shift R is a length of a line segment between the point o and the installation position, and an intersection point of the installation position vertically downward with the ground is denoted as a point Q; after the transmission tower is tilted, a position of the monitoring device is a', and the distance measured by the laser ranging sensor is m'; before the transmission tower is tilted, $\Delta aQP$ is similar to $\Delta Aoa$, and after the transmission tower is tilted, $\Delta a'Q'P'$ is similar to $\Delta A'o'a'$.

5. The method of claim 4, wherein calculating the height h' of the monitoring device from the ground comprises:

calculating a length of a line segment a'W according to the principle of similar triangles, wherein $\Delta A'o'G{\sim}\Delta a'WG$, and $$a'W = \frac{R \cos \alpha}{1 + \sqrt{L^2 - R^2} \tan \alpha \cos \alpha},$$

where a distance between a reverse extension line of a rear extension line of the monitoring device and the ground is d', the intersection point A is transferred to A', an intersection point of a horizontal direction of a' and a vertical downward extension line of A' is denoted as a point W, o is transferred to o', and an intersection point of a'o' and a vertical downward extension line of A' is G.

6. The method of claim 3, wherein calculating the height h' of the monitoring device from the ground comprises:

calculating a length of a line segment a'W according to the principle of similar triangles, wherein $\Delta A'o'G{\sim}\Delta a'WG$, and $$a'W = \frac{R \cos \alpha}{1 + \sqrt{L^2 - R^2} \tan \alpha \cos \alpha},$$

where a position of the monitoring device after the transmission tower is tilted is a', a distance between a reverse extension line of a rear extension line of the monitoring device and the ground is d', the intersection point A is transferred to A', an intersection point of a horizontal direction of a' and a vertical downward extension line of A' is denoted as a point W, o is transferred to o', and an intersection point of a'o' and a vertical downward extension line of A' is G.

* * * * *